No. 712,431. Patented Oct. 28, 1902.
C. A. BARTLIFF.
METHOD OF DISPENSING MALT LIQUORS.
(Application filed July 20, 1901.)
(No Model.)
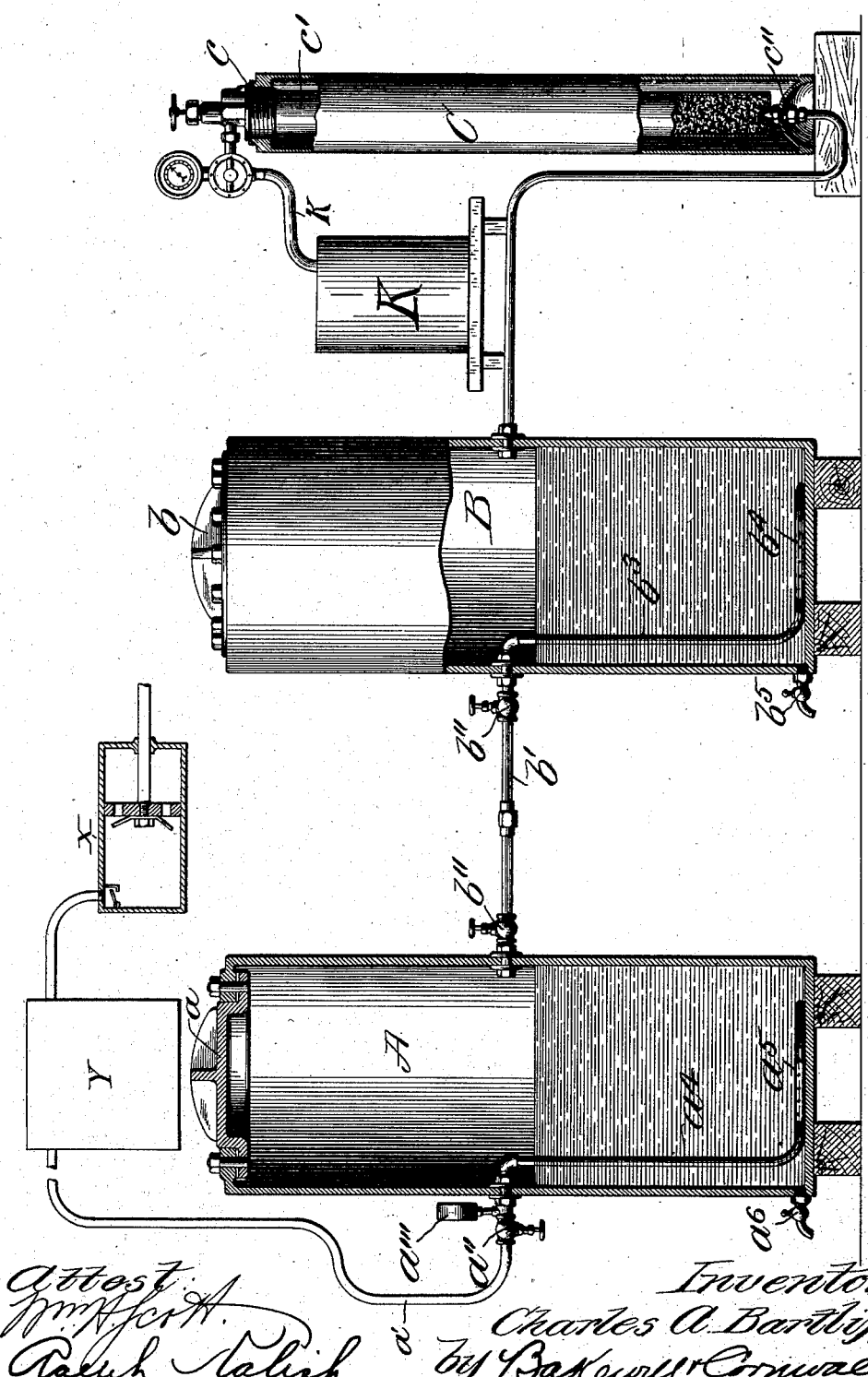

UNITED STATES PATENT OFFICE.

CHARLES A. BARTLIFF, OF ST. LOUIS, MISSOURI.

METHOD OF DISPENSING MALT LIQUORS.

SPECIFICATION forming part of Letters Patent No. 712,431, dated October 28, 1902.

Application filed July 20, 1901. Serial No. 69,032. (No specimens.)

*To all whom it may concern:*

Be it known that I, CHARLES A. BARTLIFF, a subject of the King of Great Britain, residing in the city of St. Louis, State of Missouri, have invented a certain new and useful Improvement in Methods of Dispensing Malt Liquors, of which the following is a full, clear, and exact description, such as will enable others skilled in the art to which it appertains to make and use the same, reference being had to the accompanying drawings, forming part of this specification, in which—

This invention relates to a new and useful improvement in a method of compressing and impregnating air with hops, for use in connection with a draft-beer apparatus, the compressed air impregnated with hops being employed substantially in the same manner as carbonic-acid gas is now most generally used. Hops is an ingredient largely used in the manufacture of the finer grades of beer, giving to the beer its palatable flavor and fine aroma. When the beer is sold in kegs or barrels to customers and drawn off, several methods may be used to exert pressure on the surface of the beer in the keg or barrel to force the beer through the pipes. Manually-operated and water pumps have been used for this purpose, as well as tanks containing compressed carbonic-acid gas. I propose compressing air impregnated with hops in a tank of convenient size for use, so that when the impregnated hop-air is introduced under pressure upon the surface of the beer in the keg or barrel it will act not only as a natural preservative for the beer with which it comes in contact, but will impart to a great extent to a poor quality of beer the flavor and aroma of a fine grade of beer.

My system contemplates the purification of air to be used by washing or otherwise, the purified air being then placed in contact with a strong hop solution, so that the air will absorb and retain in suspension a large percentage of hops, the air thus impregnated with hops being introduced into a suitable tank for commercial purposes.

The air may be compressed before being introduced into the washing-tank, or the air may be first washed and purified and then compressed and impregnated, or the air may be washed and impregnated and finally compressed before it is introduced into the tank. In the drawings I have illustrated the first-mentioned method—that is, the air is first compressed by a compressor X and stored in a reservoir Y in readiness for use, the air being drawn from said reservoir, cleansed, impregnated, and delivered to the tank. In any event the impregnated compressed air is introduced into a tank for commercial purposes, said air being received in a chamber, from which it is drawn through another chamber, said latter chamber containing dry hops, whereby air passing in, around, and through said dry hops absorbs the aroma of the hops and finally escapes through a pipe leading from the tank.

In an application filed by me on or about April 20, 1901, Serial No. 56,696, I have shown and described a system which may for the sake of convenience be termed a "wet" system, in that the air absorbs its properties as a preservative from a solution of hops. In this so-called "wet" system while the air is highly impregnated with hops it does not yield an aroma proportionate to the amount of hops it has absorbed, and I have found from experiment that the air treated as described in my former application and then introduced into a chamber in a tank, from which it is led through another chamber containing dry hops, will impart to the beer, in addition to its impregnation, a fine aroma, which is very desirable.

In the drawings I have illustrated a system for impregnating compressed air with hops and storing same in a tank for commercial use, said tank containing a chamber filled with dry hops, through which the impregnated air finally passes before escaping from the tank. I prefer to arrange this chamber of dry hops in a tank, so that when in use, as the tank is transported from place to place, this chamber of dry hops is local and imparts its fragrance and aroma to the impregnated air before it escapes from the tank. I will also explain that in actual practice the impregnated air in the tank is compressed to about fifteen hundred pounds to the square inch, the upper end of the tank being provided with a reducing-valve, which enables the air to escape at about a pressure of ten pounds. Thus it will be seen that the air in the receiving-chamber and in the chamber containing the dry hops is in practically a quiescent state after the tank is charged and before the air is drawn therefrom, and when the air is drawn from the tank it is so slight that the air in the final chamber containing the dry hops is to all intents and purposes quiet. At least its movement therethrough is so slow that it absorbs a fine aroma from the dry hops to a high degree.

In the drawings, X indicates a compressor for the air, and Y indicates a reservoir into which the compressed air is stored ready for use. This reservoir Y is connected to a vessel A by means of a pipe $a'$. This vessel A is preferably closed by a cover $a$, said vessel containing water or other suitable liquid for washing the air to be used. The air passes through pipe $a'$, its passage therethrough being controlled by a valve $a''$. A pressure-gage $a'''$ is preferably used for well-understood reasons. A pipe $a^4$ extends down to the bottom of the vessel A, terminating in a perforated coil $a^5$, through the openings in which the air is forced to pass in a divided state, so that practically all of its particles are subjected to contact with the liquid in the vessel. A cock $a^6$ is arranged in the bottom of the vessel for carrying off the impurities collected by the liquid.

B indicates a vessel containing a strong solution of hops. This vessel is closed by a cap or cover $b$ and is connected by a pipe $b'$ to the air-space above the liquid in vessel A. This pipe $b'$ contains a convenient coupling by which the vessels may be disconnected from each other, and on each side of the coupling are arranged valves $b''$ for obvious purposes. A pipe $b'''$ extends downwardly in the vessel, said pipe terminating in a perforated coil $b^4$, through the openings in which the purified air passes in a finely-divided state, contacting with the hops solution in the vessel B and absorbing the hops from said solution. A cock $b^5$ is arranged in the bottom of vessel B for drawing off the hop solution when desired.

It is obvious that the air in passing through the cleansing liquid in vessel A will absorb more or less moisture therefrom, and to the extent of such absorption it is incapable of taking up a corresponding quantity of hops. I may therefore use a hop solution in the vessel A, which will act as a cleansing agent and at the same time impregnate the air with the hops, or I may use some non-volatile liquid in vessel A. When the air is impregnated with hops, it is conducted off from the vessel B into a tank C through suitable pipes. This tank contains a plug $c$, introduced into its upper end, said plug having suspended therefrom a tube $c'$, extending substantially throughout the length of the tank, said tube being perforated at its bottom and containing dry hops, the upper end of the tank carrying a pressure-reducing valve and suitable pipe connections for the escape of the air.

The pipe leading from vessel B preferably connects to the bottom of tank C and passes an inwardly-opening check-valve arranged in a casing $c''$. When the proper pressure is reached in tank C, which pressure is indicated by a suitable gage attached thereto, the pipe leading from vessel B is disconnected, and the tank is ready for use. In using the tank it is connected by a suitable pipe to the space above the beer or malted liquor in the keg or barrel to be drawn, its pressure being exerted on the surface of the beer, forcing the same through the cooling-pipes or other apparatus.

The hops in the tube $c'$ impart to the impregnated air passing therethrough an aroma which said impregnated air yields as soon as it is exposed to the atmosphere.

The hops in the compressed air not only tend to preserve the beer, but as the beer is usually kept cool the hop solution in the air is liable to be condensed when in contact with the cold beer, and thus imparts to the beer a good flavor, or, if the beer is flavored with hops, a finer flavor due to the pressure of the impregnated air on the surface of the beer. The beer will absorb to a greater or less extent the impregnated air, and consequently partake of the flavor of the hops in this way, and when beer is drawn the aroma imparted to the air through the dry hops will be given out.

In the drawings I have shown a pipe $k$ leading from the upper end of tank C to the surface of liquor in a keg K, from which keg the liquor may be dispensed, as is well understood. Of course it is obvious that in dispensing the liquor from the keg the tank C need not be connected with the apparatus shown, as the inwardly-opening check-valve $c''$ will hold pressure in the tank when the same is disconnected from the apparatus.

I am aware that many minor changes in the arrangement, construction, and combination of the several parts of my device can be made and substituted for those herein shown and described without in the least departing from the nature and principle of my invention.

I do not herein claim the construction of the tank, as the same forms the subject-matter of another application filed by me contemporaneously herewith, said application being serially numbered 69,033.

The word "air" used herein is intended to mean natural air as distinguished from air mixed with other recognized gases, said other gases being present to an appreciable extent.

In a companion application, filed April 20, 1901, Serial No. 56,696, I have shown and described a method wherein air is passed through a solution of hops and then into a receptacle containing dry hops, where the compressed air remains in contact with said preparation of hops until drawn off and delivered to the surface of the malt liquor in a keg for the purpose of exerting a pressure on said liquor in dispensing the same. I do not in this application claim the process described in said above-mentioned application. However, this present application may be termed the "parent" case, as I have herein claimed, broadly, the method of dispensing malt liquors from kegs which consists in treating air with hops and finally delivering the air after it has absorbed the essence of the hops under pressure to the surface of the liquor in a keg.

I do not herein claim the article of manufacture produced by practicing my present invention, as the same forms the subject-matter of another application, filed March 6, 1902, Serial No. 96,988.

Having thus described my invention, what I claim, and desire to secure by Letters Patent of the United States, is—

1. The herein-described method of dispensing malt liquors from kegs, which consists in impregnating air with the essence of hops, and finally delivering the impregnated air, under pressure, to the surface of liquor in a keg; substantially as described.

2. The herein-described method of dispensing malt liquors from kegs, which consists in impregnating air with the essence and aroma of hops, and finally delivering the air so treated to the surface of the liquor to be dispensed, and under pressure, whereby the liquor in contact with the impregnated air may absorb the flavor and aroma of the hops; substantially as described.

3. The herein-described method of treating air in a natural state, for use in forcing malt liquors from kegs, the same consisting in impregnating said air with hops, delivering the impregnated air into a vessel, and passing the impregnated air through a chamber in the vessel containing dry hops; substantially as described.

4. The herein-described method of treating air for use in forcing malt liquors from kegs, the same consisting in compressing the air, then forcing it through a hop solution, and finally passing said air through a chamber containing dry hops; substantially as described.

5. The herein-described method of treating air for use in forcing malt liquors from kegs, the same consisting in compressing the air, then impregnating said air with hops, and finally passing the air in a compressed state through a suitable receptacle containing dry hops; substantially as described.

6. The herein-described method of treating air for use in forcing malt liquors from kegs, the same consisting in first compressing the air, then purifying the air, then impregnating said air with a solution of hops, and finally passing the air through a receptacle containing dry hops; substantially as described.

7. The herein-described method of treating air for use in forcing malt liquors from kegs, the same consisting in forcing the air under pressure into contact with a solution of hops, and finally passing the air through a chamber containing dry hops; substantially as described.

In testimony whereof I hereunto affix my signature, in the presence of two witnesses, this 18th day of July, 1901.

CHARLES A. BARTLIFF.

Witnesses:
GEORGE BAKEWELL,
RALPH KALISH.